United States Patent
Yeoum et al.

(10) Patent No.: US 8,219,088 B2
(45) Date of Patent: Jul. 10, 2012

(54) METHOD AND APPARATUS FOR REGISTERING LOCATION OF TERMINAL IN PACKET-SWITCHING DOMAIN

(75) Inventors: Tae-Sun Yeoum, Seoul (KR); Sung-Ho Choi, Suwon-si (KR); Han-Na Lim, Siheung-si (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 938 days.

(21) Appl. No.: 12/189,381

(22) Filed: Aug. 11, 2008

(65) Prior Publication Data

US 2009/0047951 A1 Feb. 19, 2009

(30) Foreign Application Priority Data

Aug. 10, 2007 (KR) .................. 10-2007-0080931

(51) Int. Cl.
*H04W 4/00* (2009.01)

(52) U.S. Cl. ............... 455/435.1; 455/439; 455/440; 455/445; 455/456.1; 455/456.2; 370/328; 709/238; 709/239

(58) Field of Classification Search ........... 455/435.1, 455/456.1–457, 436–445; 370/328; 709/238, 709/239

See application file for complete search history.

(56) References Cited

U.S. PATENT DOCUMENTS

| 6,487,408 B1 | 11/2002 | Tokuyoshi ............ 455/435 |
| 6,678,522 B2 | 1/2004 | Fukuzawa et al. ....... 455/435.1 |
| 2010/0172336 A1* | 7/2010 | Pehrsson et al. .......... 370/338 |

FOREIGN PATENT DOCUMENTS

| JP | 2006-74404 | 3/2006 |
| KR | 2005-103581 | 11/2005 |
| KR | 2007-72991 | 7/2007 |

OTHER PUBLICATIONS

Bouygues Telecom, Tmobile; "Adding Further Clarifications to Alternative 1 (eMSC Proposal);" 3GPP TSG SA WG2 Meeting #61 TD S2-074974; Slovenia; Nov. 12-16, 2007; 13pgs; http://www.3gpp.org/ftp/tsg_sa/ WG2_Arch/TSGS2_61_Ljubljana/Docs/S2-074974.zip.

Huawei, Zte; "Registration procedure for CSoPS;" 3GPP TSG SA WG2 Meeting #61 TD S2-075614; Slovenia; Nov. 12-16, 2007; 5pgs; http://www.3gpp_org/ftp/tsg_saNVG2_ArchiTSGS2_61_Ljubljana/Docs/S2-075614.zip.

* cited by examiner

*Primary Examiner* — Marcos Torres
(74) *Attorney, Agent, or Firm* — Cha & Reiter, LLC

(57) ABSTRACT

A method and apparatus for registering the location of a terminal in a PS domain in a mobile communication network are provided, in which the terminal transmits a request message requesting registration of the location of the terminal to an MME of the mobile communication network, receives from the MME a response message including an eMSC indicator indicating an eMSC connected to the MME from among a plurality of eMSCs, and registers the location of the terminal to the eMSC indicated by the eMSC indicator included in the response message if the eMSC indicator included in the response message is different from an eMSC indicator stored in the terminal.

10 Claims, 10 Drawing Sheets

METHOD AND APPARATUS FOR REGISTERING LOCATION OF TERMINAL IN PACKET-SWITCHING DOMAIN

CLAIM OF PRIORITY

This application claims the benefit of the earlier filing date, under 35 U.S.C. §119(a), to that patent application filed in the Korean Intellectual Property Office on Aug. 10, 2007 and assigned Serial No. 2007-80931, the entire disclosure of which is hereby incorporated by reference.

BACKGROUND OF THE INVENTION

1. Field of the Invention

The present invention generally relates to a mobile communication network. More particularly, the present invention relates to a method and apparatus for registering the location of a terminal in a Packet-Switching (PS) domain of a mobile communication network.

2. Description of the Related Art

FIG. 1 illustrates a conventional mobile communication network including an enhanced Mobile Switching Center (eMSC) in a PS domain.

Referring to FIG. 1, a User Equipment (UE) 131 is connected to a call service over an Internet Protocol (IP) network 101.

Reference numeral 102 denotes a mobile communication Core Network (CN) and Access Network (AN) that has been enhanced from the European 2.5$^{th}$/3$^{rd}$ Generation (2.5G/3G) mobile communication system, General Packet Radio Service/Universal Mobile Telecommunications System (GPRS/UMTS).

Enhanced Node Bs (eNBs) 121 through 126 manage wireless connections. Mobility Management Entities (MMEs) 111, 112 and 113 are responsible for authentication and registration of the UE 131 when the UE 131 is connected to the mobile communication network. They process a service request from the UE 131, and ensure mobility for the UE 131 when the UE 131 moves between eNBs. Although only three eNBs and six MMEs are shown it would be within the knowledge of those skilled in the art that this representation is merely illustrative of a conventional network and that then number of eNBs and MMEs may be increased or decreased without altering the scope of the invention.

Serving GateWays (SGWs) 105 and 106 provide a bearer service for transferring user service data, such as voice information, to the eNBs 121 to 126. A Packet Data Network GateWay (PDN GW or PGW) 104 allocates an IP address to the UE 131 connected to the mobile communication network and provides the UE 131 with IP connectivity. The PDN GW 104 acts as a general IP router in the IP network 101.

An eMSC 103 functions in a manner similar to that of an MSC in a 2G/3G mobile communication network, except that the eMSC 103 provides only PS service, and not Circuit Switching (CS) service, as compared to a conventional MSC that provides a CS service. In other words, the eMSC 103 transmits all call control signals and voice signals in IP packets. A benefit that the eMSC 103 offers by providing the packet service is that as the enhanced mobile communication CN supports radio resource management and data bearer management of the eMSC 103, the eMSC 103 is not connected directly to the eNBs 121 to 126. Therefore, the eMSC 103 can be installed independent of position in the IP network 101. For example, the eMSC 103 can be positioned like a typical IP server independent of a mobile communication network.

Interfaces between the eMSC 103 and the MMEs 111, 112 and 113 are used for providing seamless and reliable handover of a voice service, even when the UE 131 moves to a 2G/3G CS network. Despite the advantage that the eMSC 103 can provide services similar to those of a conventional CS network over the IP network 101, the following limitation exists.

1. although the eMSC should have an interface with every MME of the mobile communication CN, the MME is an entity close to eNBs and if the mobile communication network provides a service over a wide area, the number of MMEs increases proportionally and thus there is a difficulty in interfacing between the eMSC and all the MMEs. Since the interface between the eMSC and an MME is used to hand the UE over to the CS network, if the MME and the eMSC are physically far away from each other, the resulting communication delay may lead to handover delay or handover failure. In the case where a roaming service is to be provided with the aid of another service provider, the eMSC should be connected to an MME of the service provider. Due to the resulting complex roaming agreement, the roaming service may not be provided actually.

Accordingly, there exists a need for a technique for registering the location of a UE through a plurality of eMSCs or a plurality of General Access Network Controllers (GANCs) and a plurality of MSCs serving as a plurality of eMSCs.

SUMMARY OF THE INVENTION

Accordingly, an aspect of an exemplary embodiment of the present invention is to provide a method and apparatus for registering the location of a UE through a plurality of eMSCs, or a plurality of GANCs and a plurality of MSCs in a mobile communication network for supporting a service over an IP network.

Another aspect of an exemplary embodiment of the present invention provides a method and apparatus for registering the location of a UE for area update and attachment through a plurality of eMSCs, or a plurality of GANCs and a plurality of MSCs in a mobile communication network for supporting a service over an IP network.

In accordance with an aspect of an exemplary embodiment of the present invention, there is provided a method of a terminal for registering a location of the terminal in a mobile communication network, in which a request message requesting registration of the location of the terminal is transmitted to an MME of the mobile communication network, a response message including an eMSC indicator indicating an eMSC connected to the MME among a plurality of eMSCs is received from the MME, and the location of the terminal is registered to the eMSC indicated by the eMSC indicator included in the response message, if the eMSC indicator included in the response message is different from an eMSC indicator stored in the terminal.

In accordance with another aspect of an exemplary embodiment of the present invention, there is provided a method of an MME for registering a location of a terminal in a mobile communication network, in which a request message requesting registration of the location of the terminal is received from the terminal, the location of the terminal is registered according to the request message, an eMSC indicator indicating an eMSC connected to the MME among a plurality of eMSCs is determined, and a response message including the determined eMSC indicator is transmitted to the terminal.

In accordance with a further aspect of an exemplary embodiment of the present invention, there is provided an apparatus of a terminal for registering a location of the terminal in a mobile communication network, in which a transceiver transmits a request message requesting registration of the location of the terminal to an MME of the mobile communication network and receives from the MME a response message including an eMSC indicator indicating an eMSC connected to the MME among a plurality of eMSCs, and a controller registers the location of the terminal to the eMSC indicated by the eMSC indicator included in the response message, if the eMSC indicator included in the response message is different from an eMSC indicator stored in the terminal.

In accordance with still another aspect of an exemplary embodiment of the present invention, there is provided an apparatus of an MME for registering a location of a terminal in a mobile communication network, in which a controller registers the location of the terminal according to a request message requesting registration of the location of the terminal, received from the terminal and determines an eMSC indicator indicating an eMSC connected to the MME among a plurality of eMSCs, and a transceiver receives the request message from the terminal and transmits a response message including the determined eMSC indicator to the terminal.

In accordance with still further aspect of an exemplary embodiment of the present invention, there is provided a method of a terminal for registering a location of the terminal in a mobile communication network, in which a request message requesting registration of the location of the terminal is transmitted to an MME of the mobile communication network, a response message including a GANC indicator indicating a GANC connected to the MME among a plurality of GANCs is received from the MME, and the location of the terminal is registered to an MSC connected to the GANC indicated by the GANC indicator included in the response message, if the GANC indicator included in the response message is different from a GANC indicator stored in the terminal.

In accordance with yet another aspect of an exemplary embodiment of the present invention, there is provided a method of an MME for registering a location of a terminal in a mobile communication network, in which a request message requesting registration of the location of the terminal is received from the terminal, the location of the terminal is registered according to the request message, a GANC indicator indicating a GANC connected to the MME among a plurality of GANCs is determined, and a response message including the determined GANC indicator is transmitted to the terminal.

In accordance with yet still another aspect of an exemplary embodiment of the present invention, there is provided an apparatus of a terminal for registering a location of the terminal in a mobile communication network, in which a transceiver transmits a request message requesting registration of the location of the terminal to an MME of the mobile communication network and receives from the MME a response message including a GANC indicator indicating a GANC connected to the MME among a plurality of GANCs, and a controller registers the location of the terminal to an MSC connected to the GANC indicated by the GANC indicator included in the response message, if the GANC indicator included in the response message is different from a GANC indicator stored in the terminal.

In accordance with yet further aspect of an exemplary embodiment of the present invention, there is provided an apparatus of an MME for registering a location of a terminal in a mobile communication network, in which a controller registers the location of the terminal according to a request message requesting registration of the location of the terminal, received from the terminal and determines a GANC indicator indicating a GANC connected to the MME among a plurality of GANCs, and a transceiver receives the request message from the terminal and transmits a response message including the determined GANC indicator to the terminal.

BRIEF DESCRIPTION OF THE DRAWINGS

The above features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF THE INVENTION

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

While exemplary embodiments of the present invention will be described below in the context of eMSCs and a System Architecture Evolution (SAE) CN being a 3$^{rd}$ Generation Partnership Project (3GPP)-based enhanced CN in a mobile communication network that provides a call service, it is to be clearly understood that procedures of the present invention are applicable to any mobile communication network. And the UE and the MME in the mobile communication network according to the exemplary embodiments of the present invention include a controller and a transceiver, and the controller and the transceiver operate registering a location of the UE.

Figure 2:
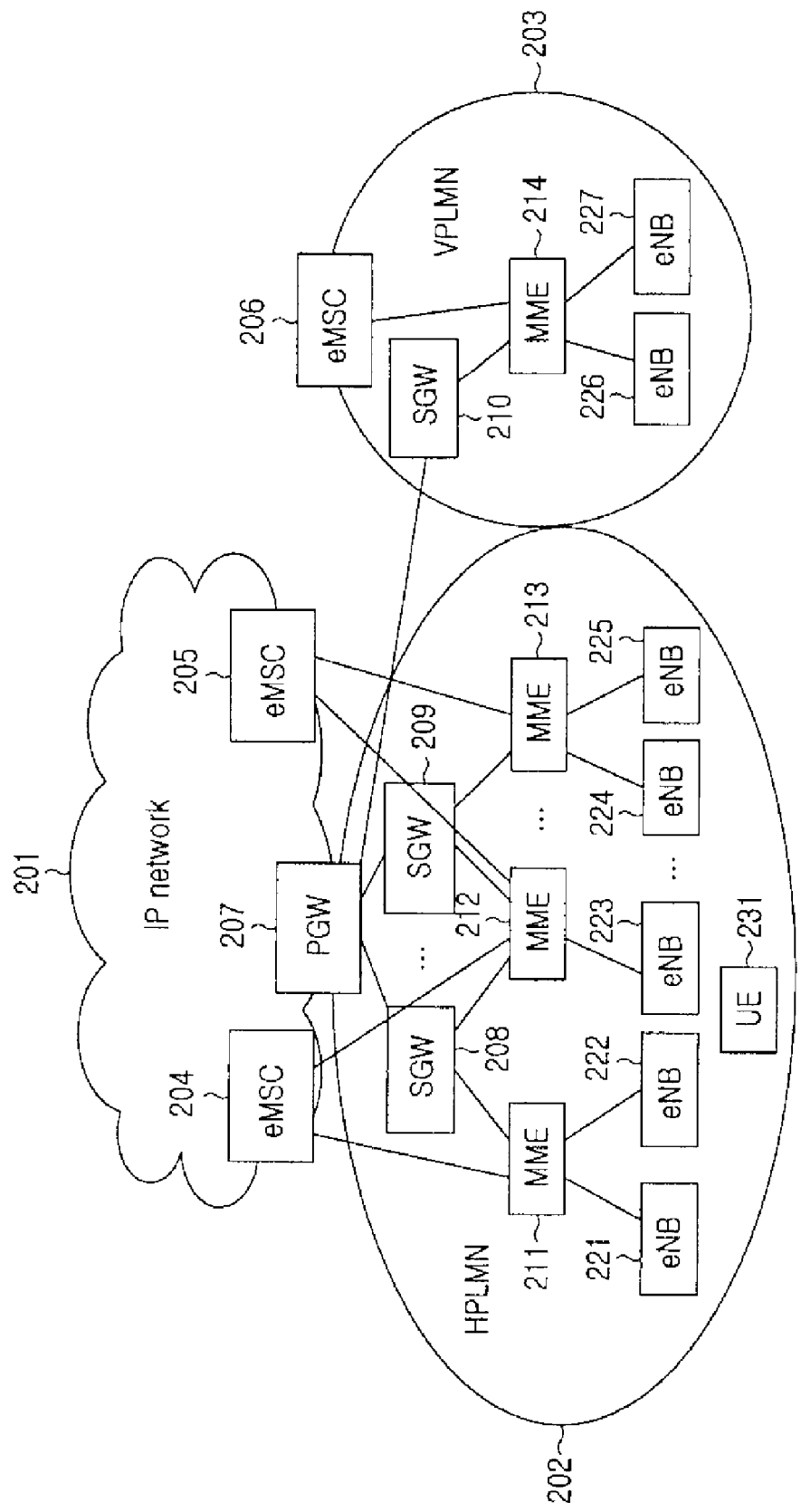
FIG. 2 illustrates a mobile communication network including a plurality of eMSCs in an IP network according to first and second exemplary embodiments of the present invention.

FIG. 2 illustrates a mobile communication network including a plurality of eMSCs in an IP network according to first and second exemplary embodiments of the present invention.

Figure 1:
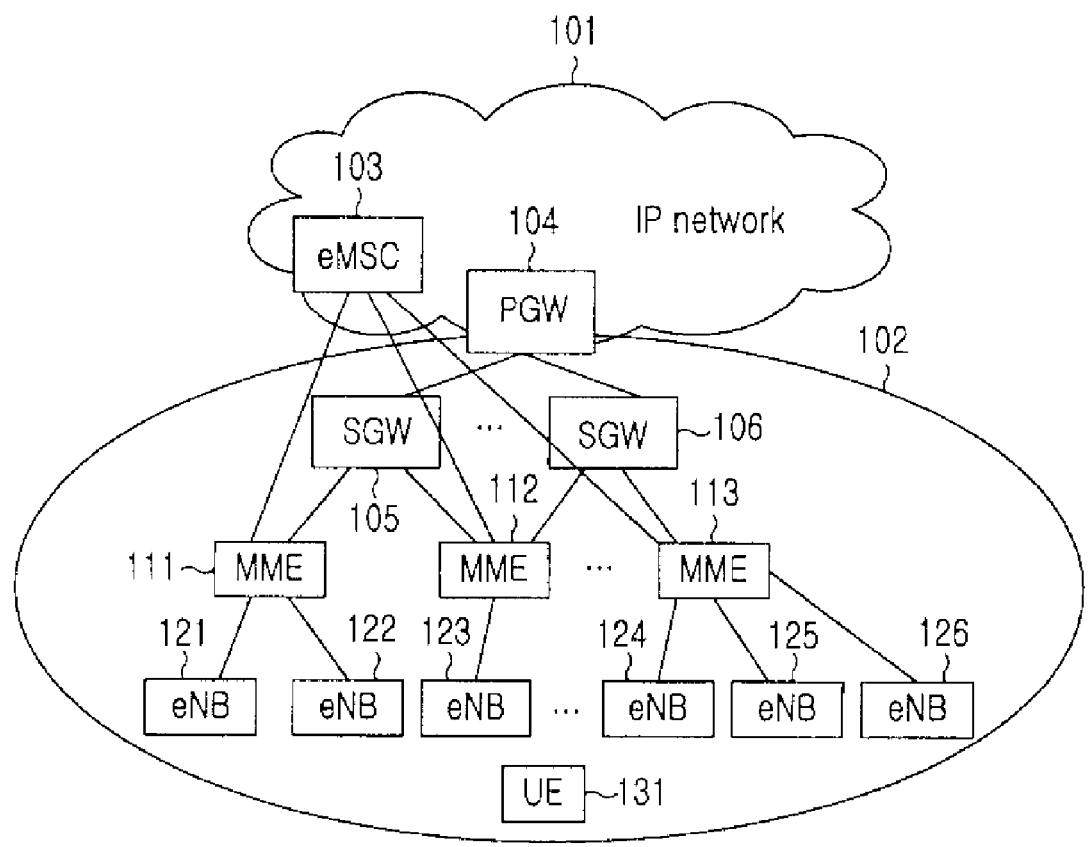
FIG. 1 illustrates a conventional mobile communication network including an eMSC in a PS domain.

Referring to FIG. 2, it is assumed that a UE 231 is connected to a call service over an IP network 201. A PGW 207 and SGWs 208, 209 and 210 operate in the same manner as the PGW 104 and the SGWs 105 and 106 illustrated in FIG. 1. Each of eMSCs 204, 205 and 206 does not need to connect to all MMEs 211 to 214, and a plurality of eMSCs can be connected to the same MME (see, for example, MME 212). The MMEs 211 to 214 have information about eMSCs connected to them or can retrieve the information from another node in the mobile communication network.

In the mobile communication network, including the plurality of eMSCs 204, 205 and 206 according to the first and second exemplary embodiments of the present invention, the UE 231 transmits a request message requesting location registration to the mobile communication network. Upon receipt of a response message including an eMSC change indicator for the request message, the UE 231 registers its location to an eMSC indicated by the eMSC change indicator, when needed.

An MME receives the request message from the UE 231, stores information about the location of the UE 231 according to the request message, determines the eMSC change indicator identifying an eMSC connected to the MME, and transmits the eMSC change indicator in the response message to the UE 231.

A description will now be made of a method for using a plurality of eMSCs in the mobile communication network, in two exemplary embodiments, depending on whether the request message is a registration request message for the UE to register its location to the mobile communication network including a plurality of eMSCs during movement (the first exemplary embodiment), or the request message is used for the UE to register its location to the mobile communication network during an initial access (the second exemplary embodiment).

Figure 3:
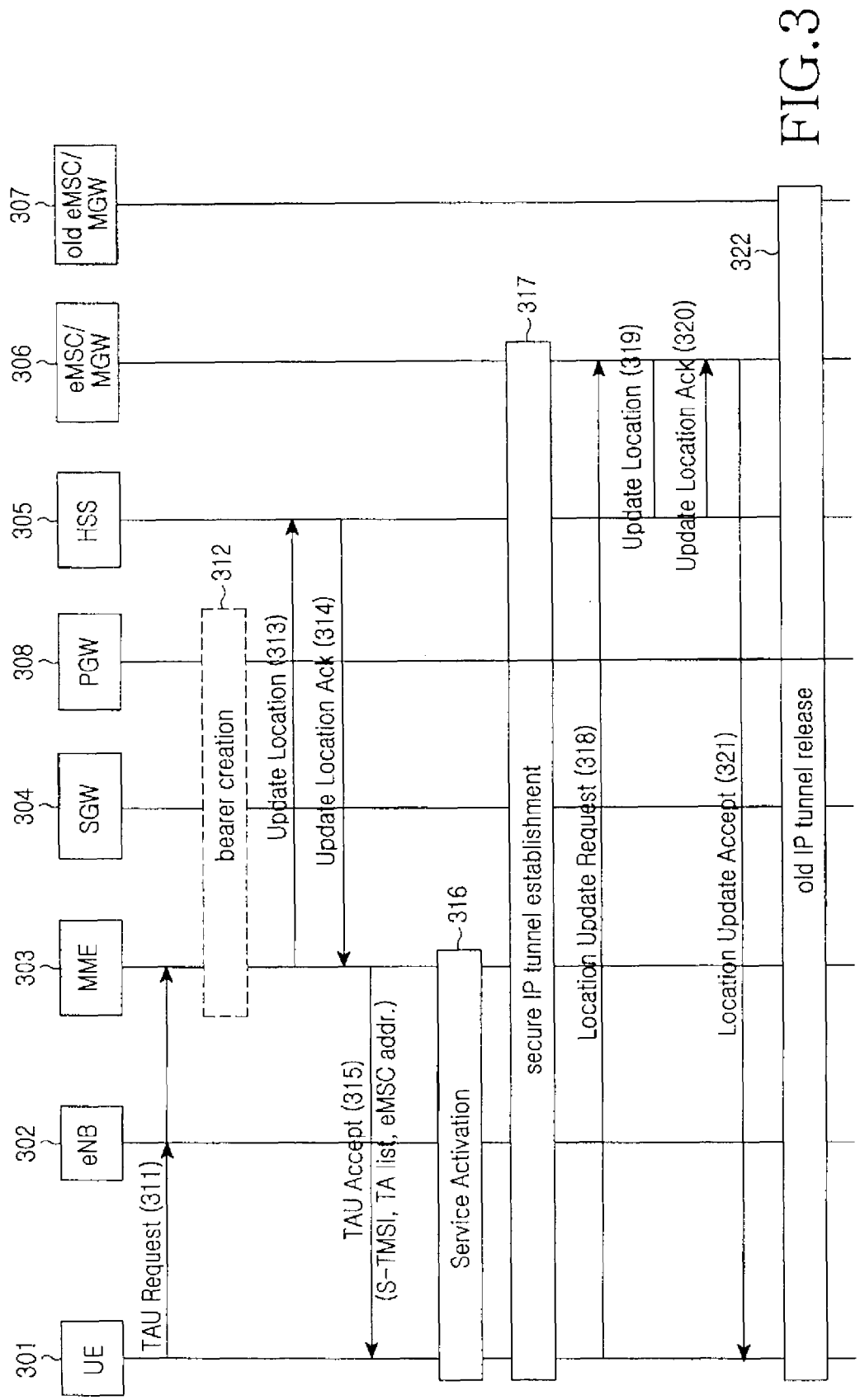
FIG. 3 is a diagram illustrating a signal flow for an operation for registering the location of a UE in the mobile communication network according to the first exemplary embodiment of the present invention.

FIG. 3 is a diagram illustrating a signal flow for an operation for registering the location of a UE in the mobile communication network according to the first exemplary embodiment of the present invention.

Referring to FIG. 3, when moving in the mobile communication network, a UE 301 transmits a Tracking Area Update (TAU) Request message to an MME 303 via an eNB 302 to register its location to the MME 303 in step 311. When the UE 301 moves out of the service area (i.e. tracking area) of an currently serving MME during movement between eNBs in the mobile communication network, the UE 301 requests change of the managing entity of the UE 301 to new MME 303 with a new service area by notifying the mobile communication CN of the movement out of the currently (referred to a "old") serving MME by the TAU Request message.

If a new SGW 304 that provides a service in the new service area is different from a current (referred hereinafter as "old") SGW, the MME 303 establishes a new bearer with the SGW 304 and a PGW 308 in step 312. The SGW 304 is a node for connecting a bearer to the same PGW 308 even though the eNB 302 is changed and the PGW 308 is a node for connecting a wireless communication network to a PDN, such as an IP network.

The MME 303 updates the location of the UE 301 in a Home Subscriber Server (HSS) 305 in step 313. If the location update is successful, the HSS 305 transmits an Update Location Acknowledgment (Ack) message indicating the successful location update for the UE 301 to the MME 303 in step 314.

In step 315, the MME 303 transmits a TAU Accept message including an eMSC change indicator and other information (e.g. SAE-Temporary Mobile Subscriber Identity (S-TMSI) or Globally Unique Temporary Identity (GUTI) and Tracking Area (TA) list) resulting from the location update to the UE 301. Wherein, the S-TMSI or the GUTI indicates user indicator instead of International Mobile Subscriber Identity (IMSI) of the UE, and the TA list includes a TA which is available to move without TAU. If the MME 303 is connected to a plurality of eMSCs, it selects one of the eMSCs according to the connection states of the MME 303 to each of the eMSCs and includes an eMSC change indictor indicating the selected eMSC in the TAU Accept message.

In accordance with the first exemplary embodiment of the present invention, an eMSC IP address is taken as an example of the eMSC change indicator.

The UE 301 compares the eMSC IP address set in the TAU Accept message with a pre-stored eMSC IP address. If the eMSC IP addresses are different, the UP 301 determines that the received eMSC IP address is that of a new eMSC 306. Thus to register its location to the new eMSC 306, the UE 301 establishes a radio bearer with the eNB 302 and connects the IP address of the eMSC 306 to the mobile communication network in step 316.

On the other hand, if the eMSC IP addresses are identical, the UE 301 requests resumption of a connection to the old eMSC 307. Meanwhile, in step 315, the UE 301 stores the eMSC IP address included in the TAU Accept message, for future comparison with the IP address of a new eMSC. After step 316, the UE 301 is capable of transmitting IP packets to the IP network over a wireless network serving for IP connectivity that a Home Public Land Mobile Network (HPLMN) 202 or a Visited Public Land Mobile Network (VPLMN) 203 provides.

In step 317, the UE 301 establishes an IP tunnel through which to transmit IP packets securely to the eMSC 306 of the IP network over the wireless network. The IP tunnel can be created by Internet Protocol Security (IPSec), Secure Socket Layer (SSL), Transport Layer Security (TLS), or the like. Such protocols are well-known in the art and need not be discussed in detail herein. If security is not required, step 317 can be skipped.

In step 318, the UE 301 transmits a Location Update Request message to the eMSC 306 through the IP tunnel to register its location to the eMSC 306 corresponding to the eMSC IP address acquired in step 315.

The eMSC 306 updates the location of the UE 301 to the HSS 305 according to the Location Update Request message in step 319. If the location update is successful, the HSS 305 transmits an Update Location Ack message to the eMSC 306 in step 320.

Upon receipt of the Update Location Ack message, the eMSC 306 transmits a Location Update Accept message to the UE 301 in step 321.

If there is still an IP tunnel connected to the old eMSC 307 after completing the location registration to the new eMSC 306, the UE 301 releases the IP tunnel from the old eMSC 307 in step 322.

Figure 4:
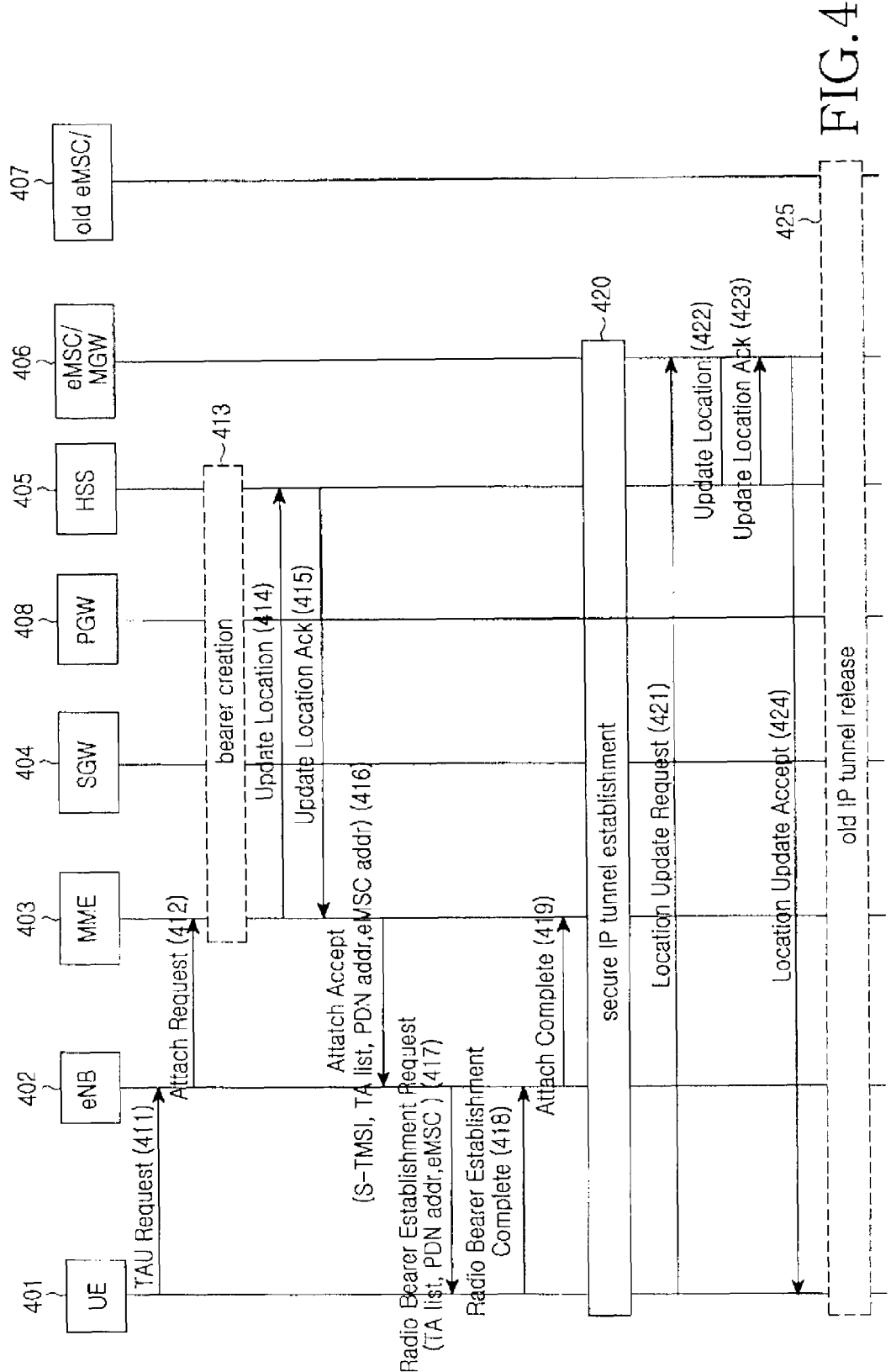
FIG. 4 is a diagram illustrating a signal flow for an operation for registering the location of a UE in the mobile communication network according to the second exemplary embodiment of the present invention.

FIG. 4 is a diagram illustrating a signal flow for an operation for registering the location of a UE in the mobile communication network according to the second exemplary embodiment of the present invention.

Referring to FIG. 4, during an initial access to the mobile communication network (e.g. power-on), a UE 401 transmits an Attach Request message to an eNB 402 to register its location to the mobile communication network in step 411. In step 412, the eNB 402 transmits the Attach Request message to an MME 403.

In step 413, the MME 403 establishes default bearers with the eNB 402, an SGW 404, and a PGW 408 to provide a default bearer service to the UE 401. The SGW 404 is a node for connecting a bearer to the same PGW 408 even though the eNB 402 is changed and the PGW 408 is a node for connecting a wireless communication network to a PDN such as an IP network.

The MME 403 updates the location of the UE 401 to an HSS 405 in step 414. If the location update is successful, the HSS 405 transmits an Update Location Ack message indicating the successful location update of the UE 401 to the MME 403 in step 415.

In step 416, the MME 403 transmits to the eNB 402 an Attach Accept message including an eMSC change indicator and other information (e.g. S-TMSI, TA list, and Packet Data Network (PDN) addr) resulting from the location update. Wherein, The PDN indicate IP Address in IP network.

To complete the connection procedure, the eNB 402 transmits a Radio Bearer Establishment Request message including the eMSC change indicator as an Ack message (acknowledgement) for the Attach Request message to the UE 401 in step 417.

In accordance with the second exemplary embodiment of the present invention, an eMSC IP address is taken as an example of the eMSC change indicator.

The UE 401 transmits a Radio Bearer Establishment Complete message to the eNB 402 in step 418. If the Radio Bearer Establishment Request message does not include information updated by the MME 403, such as a new S-TMSI, step 418 can be skipped. Meanwhile, the UE 401 stores the eMSC IP address included in the Radio Bearer Establishment Request message, for future comparison with the IP address of a new eMSC in step 418.

The eNB 402 transmits an Attach Complete message to the MME 403 according to the Radio Bearer Establishment Complete message, thereby completing the connection procedure in step 419.

In step 420, the UE 401 establishes an IP tunnel through which to transmit IP packets securely to the eMSC 406 of the IP network via the radio bearer. The IP tunnel can be created by IPSec, SSL, TLS, or the like. If security is not required, step 420 can be skipped. In step 421, the UE 401 transmits a Location Update Request message to the eMSC 406 corresponding to the eMSC IP address acquired in step 418 through the IP tunnel to register its location to the eMSC 406.

The eMSC 406 updates the location of the UE 401 to the HSS 405 according to the Location Update Request message in step 422. If the location update is successful, the HSS 405 transmits an Update Location Ack message to the eMSC 406 in step 423.

Upon receipt of the Update Location Ack message, the eMSC 406 transmits a Location Update Accept message to the UE 401 in step 424.

If there is still an IP tunnel connected to an old eMSC 407 after completing the location registration to the new eMSC 406, the UE 401 releases the IP tunnel from the old eMSC 407 in step 425.

Figure 5:
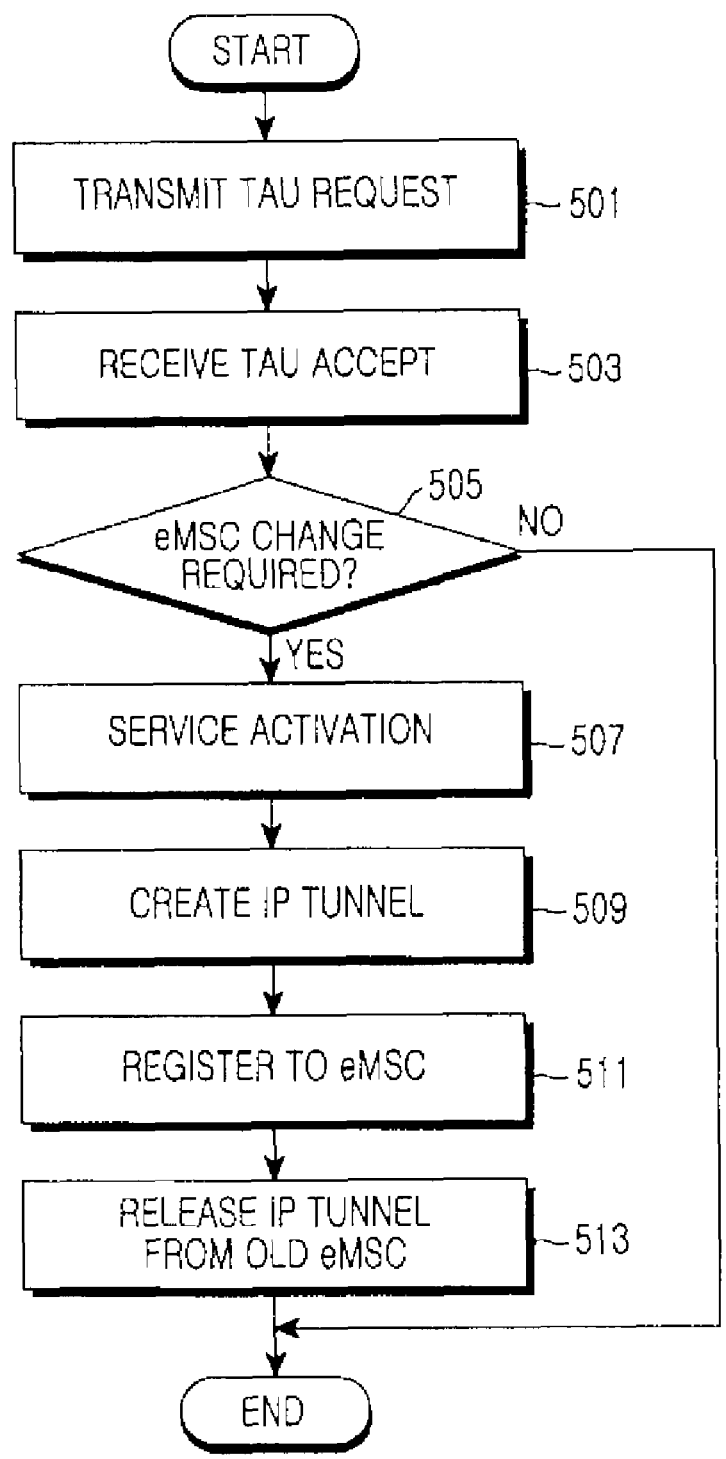
FIG. 5 is a flowchart illustrating an operation of a UE for registering its location in the mobile communication network according to the first exemplary embodiment of the present invention.

FIG. 5 is a flowchart illustrating an operation of a UE for registering its location in the mobile communication network according to the first exemplary embodiment of the present invention.

Referring to FIG. 5, the UE 301 transmits a TAU Request message to the MME 303 to register its location to the MME 303 during movement in the mobile communication network in step 501.

In step 503, the UE 301 receives a TAU Accept message including an eMSC IP address from the MME 303.

The UE 301 compares the eMSC IP address set in the TAU Accept message with a pre-stored eMSC IP address. If the IP addresses are different, the UE 301 determines that an eMSC change is required in step 505 and proceeds to step 507. If the IP addresses are identical, the UE 301 requests resumption of a connection to the old eMSC 307 when needed and ends the procedure.

To register its location to the new eMSC 306, the UE 301 requests establishment of a radio bearer as service activation in step 507.

In step 509, the UE 301 establishes an IP tunnel through which to transmit EP packets securely to the eMSC 306 of the IP network over the wireless network.

In step 511, the UE 301 registers its location to the eMSC 306. Thus the UE 301 is capable of making or receiving a voice call through the eMSC 306.

If there is still an IP tunnel connected to the old eMSC 307 after completing the location registration to the new eMSC 306, the UE 301 releases the IP tunnel from the old eMSC 307 in step 513.

Figure 6:
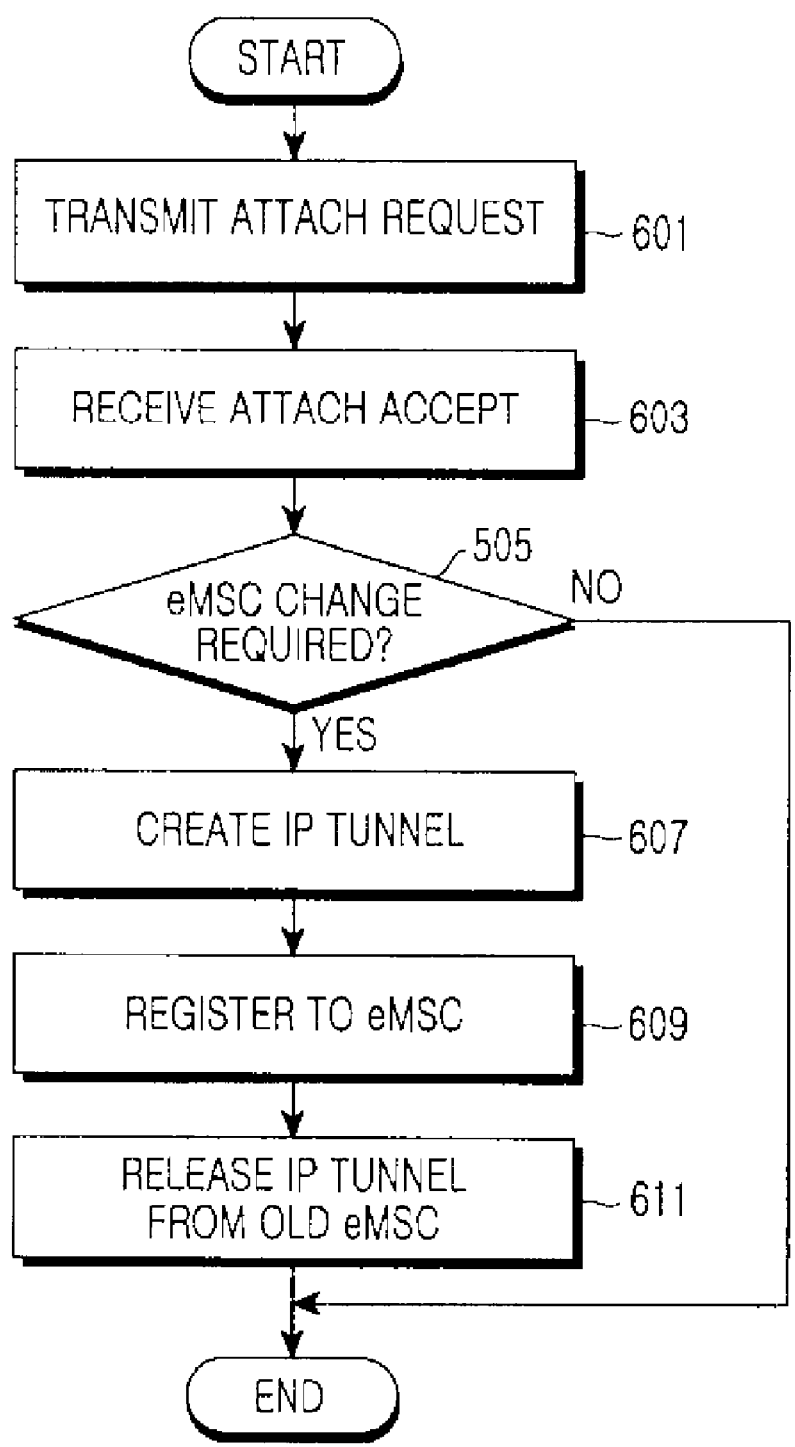
FIG. 6 is a flowchart illustrating an operation of a UE for registering its location in the mobile communication network according to the second exemplary embodiment of the present invention.

FIG. 6 is a flowchart illustrating an operation of a UE for registering its location in the mobile communication network according to the second exemplary embodiment of the present invention.

Referring to FIG. 6, during an initial access to the mobile communication network, the UE 401 transmits an Attach Request message to the MME 403 in order to register its location to the MME 403 in step 601.

In step 603, the UE 401 receives a Radio Bearer Establishment Request message including an eMSC IP address from the MME 403 from the eNB 402 that has received an Attach Accept message.

The UE 401 compares the eMSC IP address set in the Radio Bearer Establishment Request message with a pre-stored eMSC IP address and determines whether to change the old eMSC 407 according to the comparison in step 605. If the IP addresses are different, the UE 401 proceeds to step 607, considering that the eMSC change is required. If the IP addresses are identical, the UE 401 requests resumption of a connection to the old eMSC 407 and ends the procedure.

In step 607, the CE 401 establishes an IP tunnel through which to transmit IP packets securely to the new eMSC 406 of the IP network via the radio bearer.

The UE 401 registers its location to the new eMSC 406 in step 609. Thus, the UE 401 is capable of making or receiving a voice call through the new eMSC 406.

If there is still an IP tunnel connected to the old eMSC 407, the UE 401 releases the IP tunnel from the old eMSC 407 in step 611.

Figure 7:
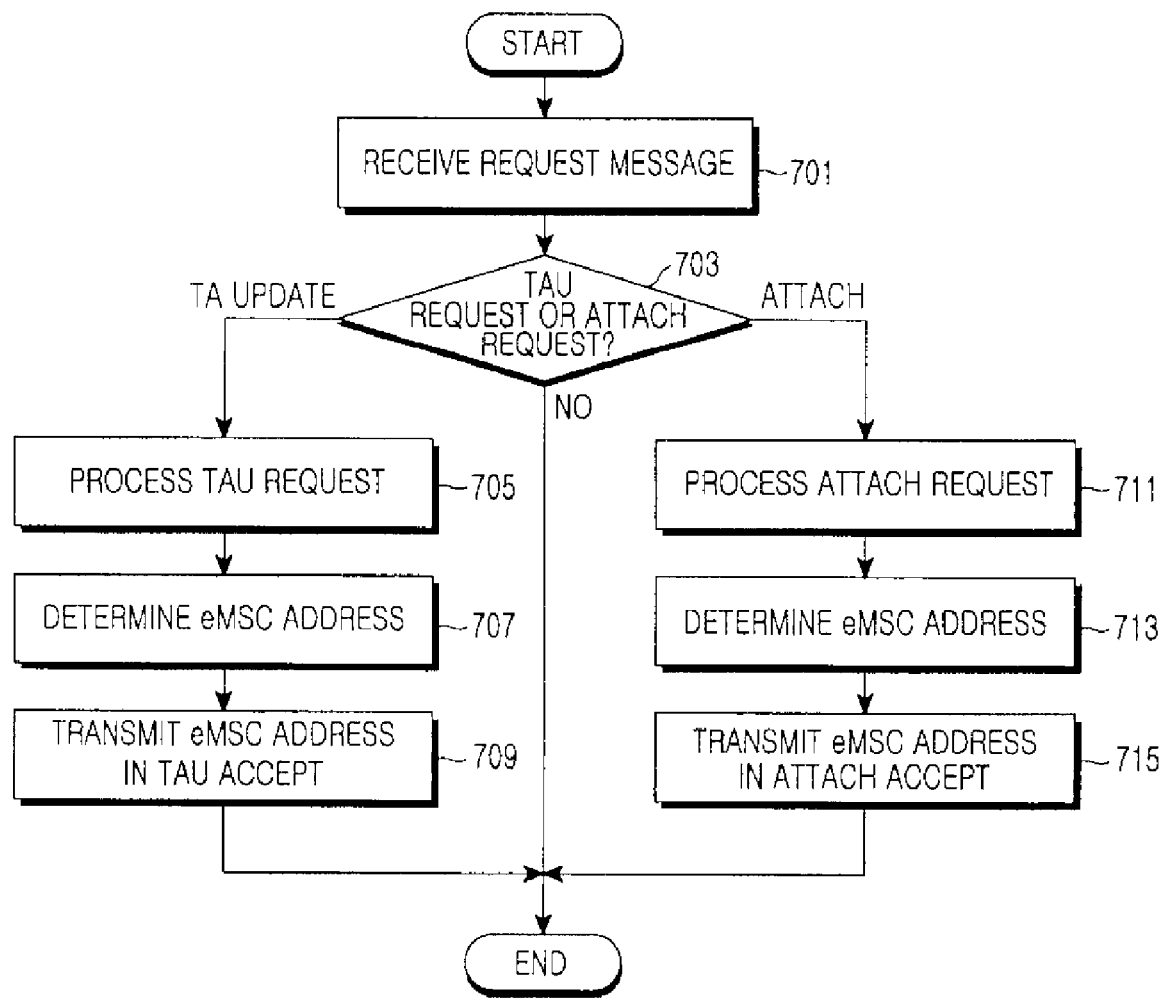
FIG. 7 is a flowchart illustrating an operation of an MME for registering the location of a UE in the mobile communication network according to the first and second exemplary embodiments of the present invention.

FIG. 7 is a flowchart illustrating an operation of an MME for registering the location of a UE in the mobile communication network according to the first and second exemplary embodiments of the present invention.

Referring to FIG. 7, the MME receives a request message requesting location registration from the UE in step 701. If the request message is a TAU Request message in step 703, the MME proceeds to step 705. If the request message is an Attach Request message in step 703, the MME proceeds to step 711. If the request message is neither the TAU Request message nor the Attach Request message, the MME ends the procedure.

The MME performs the afore-described procedure of the first exemplary embodiment of the present invention according to the TAU Request message in step 705.

The MME determines an eMSC IP address to be transmitted to the UE according to its connection state to an eMSC in step 707 and transmits a TAU Accept message including the eMSC IP address to the WE in step 709.

Meanwhile, the MME performs the afore-described procedure of the second exemplary embodiment of the present invention according to the Attach Request message in step 711.

The MME determines an eMSC IP address to be transmitted to the UE according to its connection state to an eMSC in step 713 and transmits an Attach Accept message including the eMSC IP address to the eNB in step 715.

Figure 8:
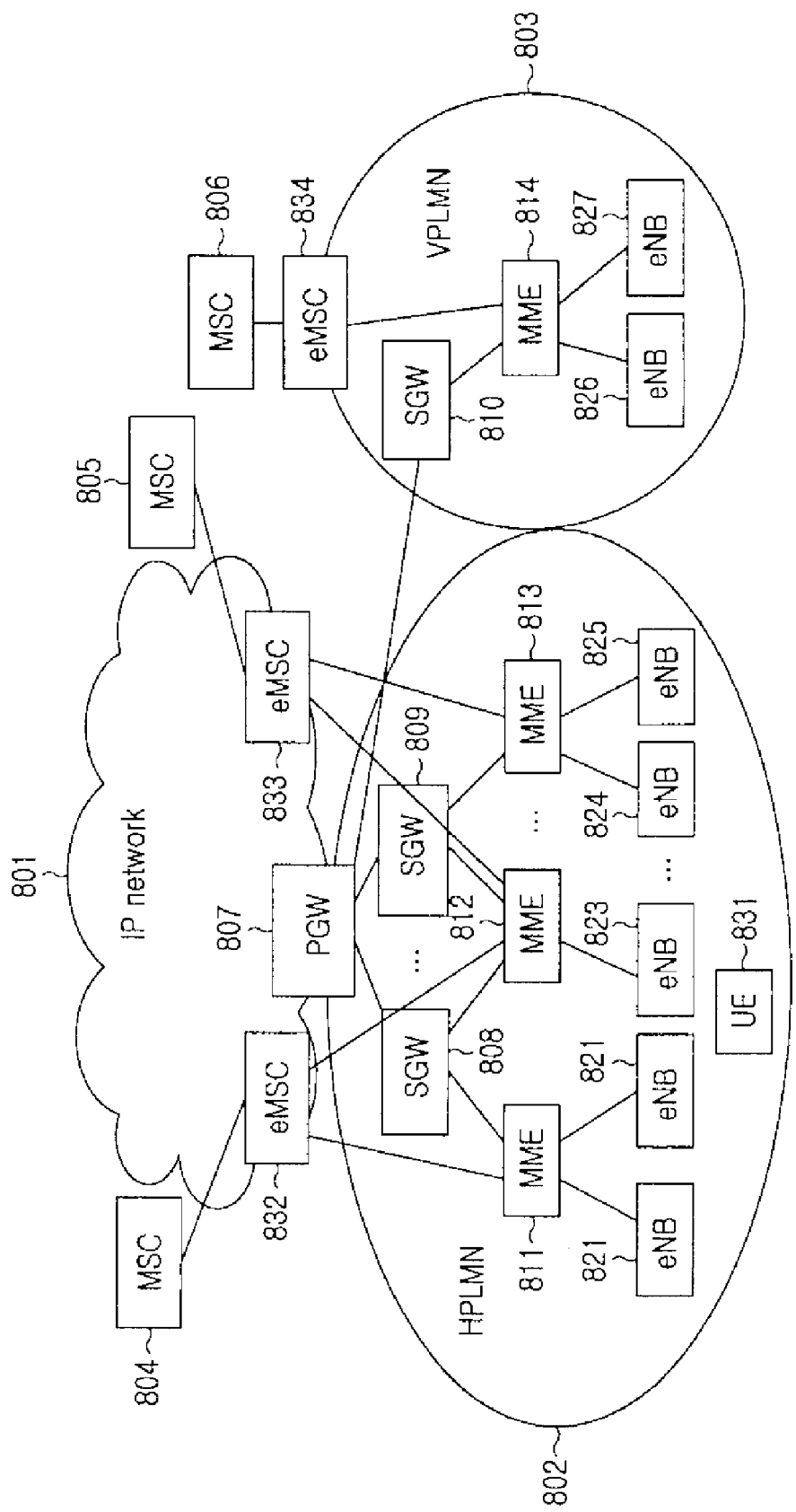
FIG. 8 illustrates a mobile communication network including a plurality of GANCs in an IP network and a plurality of MSCs according to third and fourth exemplary embodiments of the present invention.

FIG. 8 illustrates a mobile communication network including a plurality of GANCs in an IP network and a plurality of MSCs according to third and fourth exemplary embodiments of the present invention.

Referring to FIG. 8, the functions of the eMSCs 204, 205 and 206 of the first and second exemplary embodiments of the present invention are distributed to GANCs 832, 833 and 834, and MSCs 804, 805 and 806 according to the third and fourth exemplary embodiments of the present invention. Other entities are the same as their counterparts illustrated in FIG. 2 in function and configuration.

In other words, the GANCs 832, 833 and 834 take over the functions of the eMSCs 204, 205 and 206 except for the functions of conventional MSCs. The GANCs 832, 833 and 834 each process an IP packet received from a UE 831, convert the processed IP packet to a message suitable for an A interface or Iu-CS interface that a conventional MSC can interpret, and ensure secure data transmission/reception to and from the UE 831.

Figure 9:
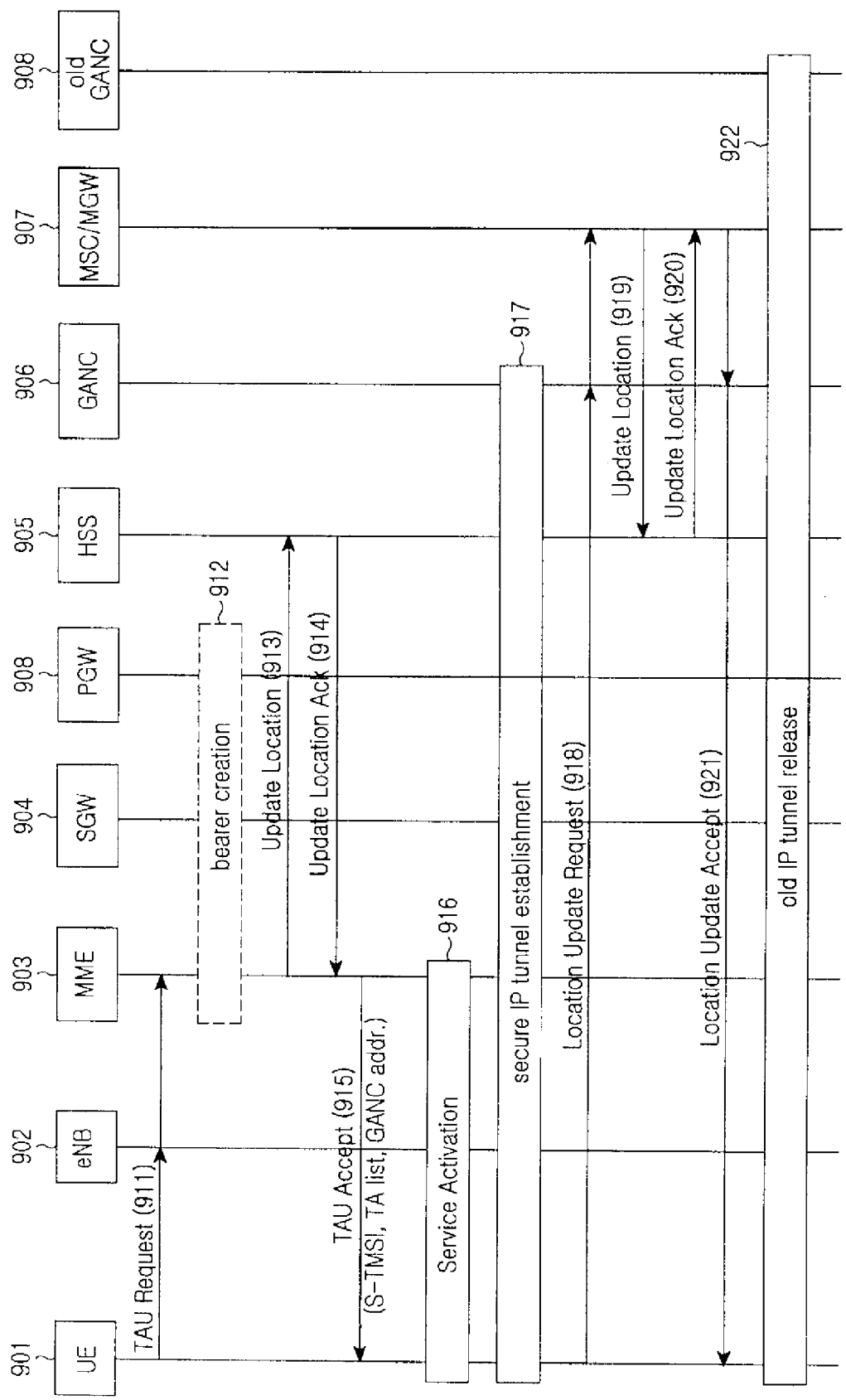
FIG. 9 is a diagram illustrating a signal flow for an operation for registering the location of a UE in the mobile communication network according to the third exemplary embodiment of the present invention.

FIG. 9 is a diagram illustrating a signal flow for an operation for registering the location of a UE in the mobile communication network according to the third exemplary embodiment of the present invention.

Referring to FIG. 9, steps 911 through 914 are performed in the same manner as steps 311 to 314 of FIG. 3.

That is, when moving in the mobile communication network, a UE 901 transmits a TAU Request message to an MME 903 via an eNB 902 to register its location to the MME 903 in step 911. If a new SGW 904 that provides a service in the new service area is different from an old SGW, the MME 903 establishes a new bearer with the SGW 904 and a PGW 908 in step 912 and updates the location of the UE 901 to an HSS 905 in step 913. If the location update is successful, the HSS 905 transmits an Update Location Ack message indicating the successful location update of the UE 901 to the MME 903 in step 914.

In step 915, the MME 903 transmits to the UE 901 a TAU Accept message including a GANC change indicator and other information (e.g. S-TMSI and TA list) resulting from the location update. If the MME 903 is connected to a plurality of GANCs, it selects one of them according to its connection states and includes a GANC change indictor indicating the selected GANC in the TAU Accept message.

In accordance with the third exemplary embodiment of the present invention, a GANC IP address is taken as an example of the GANC change indicator.

The UE 901 compares the GANC IP address set in the TAU Accept message with a pre-stored GANC IP address. If the GANC IP addresses are different, the UE 901 determines that the received GANC IP address is that of a new GANC 906. Thus to register its location to the new GANC 906, the UE 901 establishes a radio bearer with the eNB 902 and connects the IP address of the GANC 906 to the mobile communication network in step 916.

On the other hand, if the GANC IP addresses are identical, the UE 901 requests resumption of a connection to an old GANC 908. Meanwhile, the UE 901 stores the GANC IP address included in the TAU Accept message, for future comparison with the IP address of a new GANC. After step 916, the UE 901 is capable of transmitting IP packets to the IP network over a wireless network serving for IP connectivity that a HPLMN 802 or a VPLMN 803 provides.

In step 917, the UE 901 establishes an IP tunnel through which to transmit IP packets securely to the GANC 906 of the IP network over the wireless network. The IP tunnel can be created by IPSec, SSL, TLS, or the like. If security is not required, step 917 can be skipped.

In step 918, the UE 901 transmits a Location Update Request message to a new MSC 907 through the IP tunnel connected to the GANC 906 corresponding to the GANC IP address acquired in step 915 to register its location to the new MSC 907.

The MSC 907 updates the location of the UE 901 to the HSS 905 according to the Location Update Request message in step 919. If the location update is successful, the HSS 905 transmits an Update Location Ack message to the MSC 907 in step 920.

Upon receipt of the Update Location Ack message, the MSC 907 transmits a Location Update Accept message to the UE 901 through the GANC 906 in step 921.

If there is still an IP tunnel connected to the old GANC 908 after completing the location registration to the new MAC 907, the UE 901 releases the IP tunnel from the old GANC 908 in step 922.

Figure 10:
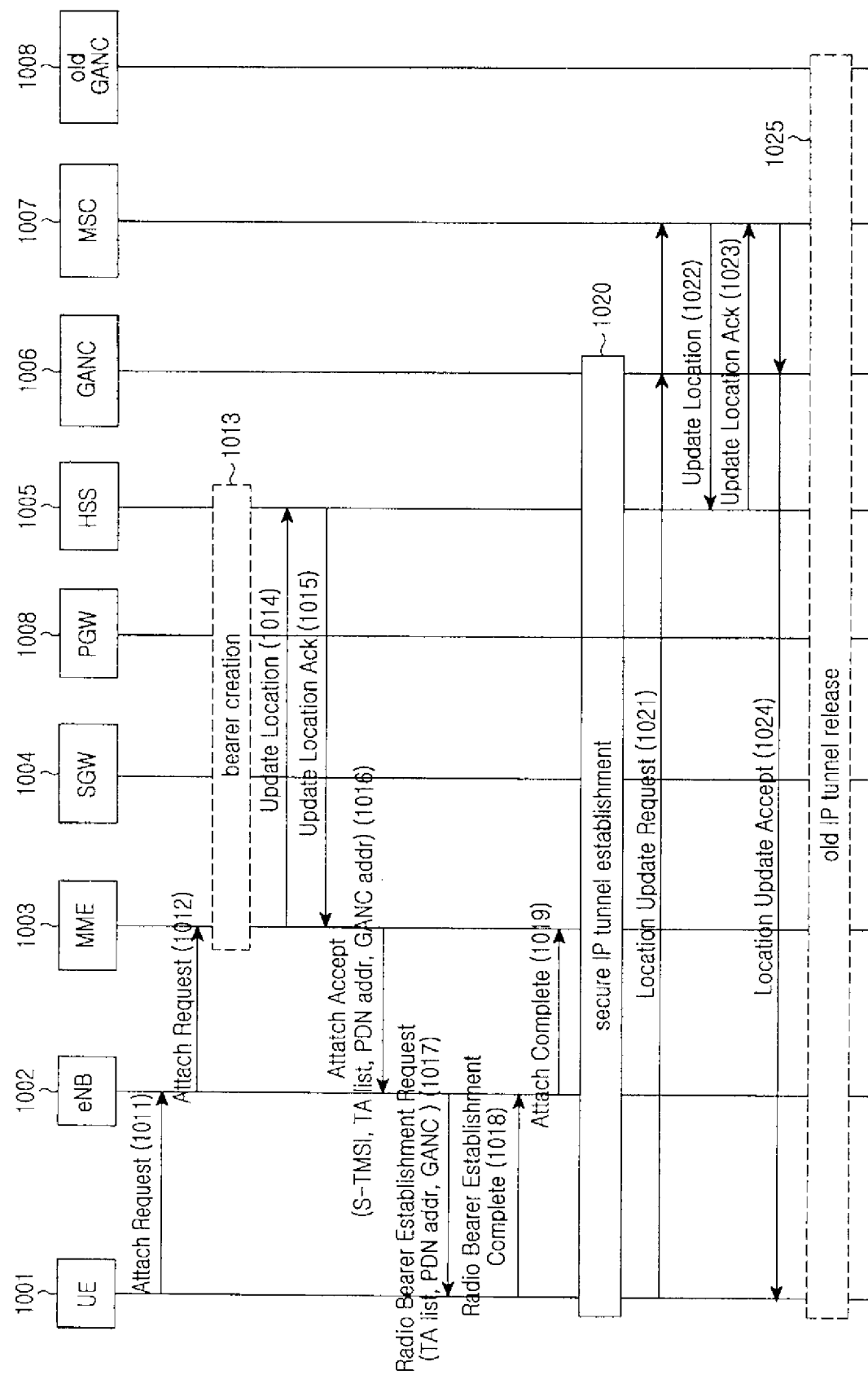
FIG. 10 is a diagram illustrating a signal flow for an operation for registering the location of a UE in the mobile communication network according to the fourth exemplary embodiment of the present invention.

FIG. 10 is a diagram illustrating a signal flow for an operation for registering the location of a UE in the mobile communication network according to the fourth exemplary embodiment of the present invention.

Referring to FIG. 10, steps 1011 through 1015 are performed in the same manner as steps 411 through 415 of FIG. 4. That is, during an initial access to the mobile communication network, a UE 1001 transmits an Attach Request message to an eNB 1002 to register its location to the mobile communication network in step 1011. In step 1012, the eNB 1002 transmits the Attach Request message to an MME 1003. In step 1013, the MME 1003 establishes default bearers with the eNB 1002, an SGW 1004, and a PGW 1008 to provide a default bearer service to the UE 1001. The MME 1003 updates the location of the UE 1001 to an HSS 1005 according to the Attach Request message in step 1014. If the location update is successful, the HSS 1005 transmits an Update Location Ack message indicating the successful location update of the UE 1001 to the MME 1003 in step 1015.

In step 1016, the MME 1003 transmits to the eNB 1002 an Attach Accept message including a GANC change indicator and other information (e.g. S-TMSI, TA list, and PDN addr) resulting from the location update.

To complete the connection procedure, the eNB 1002 transmits a Radio Bearer Establishment Request message including the GANC change indicator as an acknowledgement (Ack) for the Attach Request message to the UE 1001 in step 1017.

In accordance with the fourth exemplary embodiment of the present invention, a GANC IP address is taken as an example of the GANC change indicator.

The UE 1001 transmits a Radio Bearer Establishment Complete message to the eNB 1002 in step 1018. If the Radio Bearer Establishment Request message does not include information updated by the MME 1003, such as a new S-TMSI, step 1018 can be skipped. Meanwhile, the UE 1001 stores the GANC IP address included in the Radio Bearer Establishment Request message, for future comparison with the IP address of a new GANC in step 1018.

The eNB 1002 transmits an Attach Complete message to the MME 1003 according to the Radio Bearer Establishment Complete message, thereby completing the connection procedure in step 1019.

In step 1020, the UE 1001 establishes an IP tunnel through which to transmit IP packets securely to the GANC 1006 of the IP network via the radio bearer. The IP tunnel can be created by IPSec, SSL, TLS, or the like. If security is not required, step 1020 can be skipped. In step 1021, the UE 1001 transmits a Location Update Request message to a new MSC 1007 through the IP tunnel to register its location to the MSC 1007 via the new GANC 1006 corresponding to the GANC IP address acquired in step 1018.

The MSC 1007 updates the location of the UE 1001 to the HSS 1005 according to the Location Update Request message in step 1022. If the location update is successful, the HSS 1005 transmits an Update Location Ack message to the MSC 1007 in step 1023.

Upon receipt of the Update Location Ack message, the MSC 1007 transmits a Location Update Accept message to the UE 1001 via the GANC 1006 in step 1024.

If there is still an IP tunnel connected to an old GANC 1008 after completing the location registration to the new MSC 1007, the UE 1001 releases the IP tunnel from the old GANC 1008 in step 1025.

As is apparent from the above description, the present invention pertains to registration of the location of a UE to support a voice service over an IP network. The present invention enables interworking between an eMSC operating in the IP network and a mobile communication CN. That is, since the eMSC can be located near to a 2G/3G MSC in a network structure, the success rate and performance of a handover to or from a legacy network can be increased.

Also, when a UE roams to a network managed by another service provider, the present invention advantageously enables use of an eMSC of the network without additional UE manipulation and setting.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method of a terminal for registering a location of the terminal in a mobile communication network, comprising:
   transmitting a Tracking Area Update (TAU) request message requesting registration of the location of the terminal to a Mobility Management Entity (MME) of the mobile communication network;
   receiving by the terminal from the MME a Tracking Area Update (TAU) response message including an enhanced Mobile Switching Center (eMSC) indicator indicating an eMSC connected to the MME among a plurality of eMSCs; and
   registering the location of the terminal to the eMSC indicated by the eMSC indicator included in the Tracking Area Update (TAU) response message, if the eMSC indicator included in the Tracking Area Update (TAU) response message is different than an eMSC indicator stored in the terminal.

2. The method of claim 1, wherein the registration comprises:
   establishing a radio bearer between the terminal and a Node B (eNB), for Internet Protocol (IP) transmission; and
   transmitting a Location Update Request message to the eMSC via the radio bearer, for location registration and receiving a Location Update Accept message from the eMSC.

3. The method of claim 2, further comprising establishing an IP tunnel to the eMSC to transmit at least one IP packet including the Location Update Request message.

4. The method of claim 3, further comprising releasing an IP tunnel connected to an eMSC to which a previous location of the terminal was registered, after registering the location of the terminal to the eMSC.

5. A method of a Mobility Management Entity (MME) for registering a location of a terminal in a mobile communication network, comprising:
   receiving from the terminal a Tracking Area Update (TAU) request message requesting registration of the location of the terminal; registering the location of the terminal according to the Tracking Area Update (TAU) request message and determining an enhanced Mobile Switching Center (eMSC) indicator indicating an eMSC connected to the MME among a plurality of eMSCs; and
   transmitting a Tracking Area Update (TAU) response message including the determined eMSC indicator to the terminal.

6. An apparatus of a terminal for registering a location of the terminal in a mobile communication network, comprising:
   a transceiver for transmitting a Tracking Area Update (TAU) request message requesting registration of the location of the terminal to a Mobility Management Entity (MME) of the mobile communication network and receiving from the MME a Tracking Area Update (TAU) response message including an enhanced Mobile Switching Center (eMSC) indicator indicating an eMSC connected to the MME from among a plurality of eMSCs; and
   a controller for registering the location of the terminal to the eMSC indicated by the eMSC indicator included in the Tracking Area Update (TAU) response message, if the eMSC indicator included in the Tracking Area Update (TAU) response message is different than an eMSC indicator stored in the terminal.

7. The apparatus of claim 6, wherein the transceiver transmits a location update request message to the eMSC, for location registration and receives a location update accept message from the eMSC via a radio bearer established between the terminal and a Node B, for Internet Protocol (IP) transmission.

8. The apparatus of claim 7, wherein the controller establishes an IP tunnel to the eMSC to transmit at least one IP packet including the location update request message.

9. The apparatus of claim 8, wherein the controller releases an IP tunnel connected to an eMSC to which a previous location of the terminal was registered, after registering the location of the terminal to the eMSC.

10. An apparatus of a Mobility Management Entity (MME) for registering a location of a terminal in a mobile communication network, comprising:

a controller for registering the location of the terminal according to a Tracking Area Update (TAU) request message requesting registration of the location of the terminal received from the terminal and determining an enhanced Mobile Switching Center (eMSC) indicator indicating an eMSC connected to the MME among a plurality of eMSCs; and a transceiver for receiving the Tracking Area Update (TAU) request message from the terminal and transmitting a Tracking Area Update (TAU) response message including the determined eMSC indicator to the terminal.

* * * * *